(12) United States Patent
Sukonik et al.

(10) Patent No.: US 9,769,092 B2
(45) Date of Patent: Sep. 19, 2017

(54) PACKET BUFFER COMPRISING A DATA SECTION AND A DATA DESCRIPTION SECTION

(75) Inventors: Vitaly Sukonik, Katzir (IL); Sarig Livne, Ramat Gan (IL); Rafi Tamir, Petah Tikva (IL); Jakob Carlström, Uppsala (SE)

(73) Assignee: Marvell International LTD., Hamilton (BM)

( * ) Notice: Subject to any disclaimer, the term of this patent is extended or adjusted under 35 U.S.C. 154(b) by 1250 days.

(21) Appl. No.: 13/521,799

(22) PCT Filed: Dec. 22, 2010

(86) PCT No.: PCT/EP2010/070545
§ 371 (c)(1),
(2), (4) Date: Jul. 12, 2012

(87) PCT Pub. No.: WO2011/085934
PCT Pub. Date: Jul. 21, 2011

(65) Prior Publication Data
US 2012/0294315 A1 Nov. 22, 2012

Related U.S. Application Data

(60) Provisional application No. 61/295,792, filed on Jan. 18, 2010.

(30) Foreign Application Priority Data

Jan. 18, 2010 (SE) ..................................... 1050043

(51) Int. Cl.
*H04L 12/54* (2013.01)
*H04L 12/879* (2013.01)

(52) U.S. Cl.
CPC .................................. *H04L 49/901* (2013.01)

(58) Field of Classification Search
CPC .......................... G06F 2212/652; H04L 49/901
See application file for complete search history.

(56) References Cited

U.S. PATENT DOCUMENTS 6,470,415 B1    10/2002   Starr et al.
6,480,489 B1 * 11/2002   Muller .................... H04L 49/90
                                                                                                                                             370/389

(Continued)

FOREIGN PATENT DOCUMENTS

WO    WO-00/52879 A2    9/2000

OTHER PUBLICATIONS

Iyer et al., "Designing packet buffers for router linecards," IEEE/ACM Transactions on networking, vol. 16, No. 3, Jun. 2008.

(Continued)

*Primary Examiner* — Huy D Vu
*Assistant Examiner* — Bao G Nguyen

(57) ABSTRACT

The present invention relates to a data buffer memory (104) and method for storing data in a data communications network, and to a data buffer system (100) comprising such a data buffer memory. The data buffer memory comprising a data section (104a') comprising a number of memory pages (104a); and a package descriptor section (104b') comprising a 5 number of package descriptors (104b); wherein at least one queue (103) of packets is stored in the data section (104a') as an ordered set of packages, and wherein a package is an ordered set of packets.

22 Claims, 3 Drawing Sheets

(56) References Cited

U.S. PATENT DOCUMENTS

Figure 1:
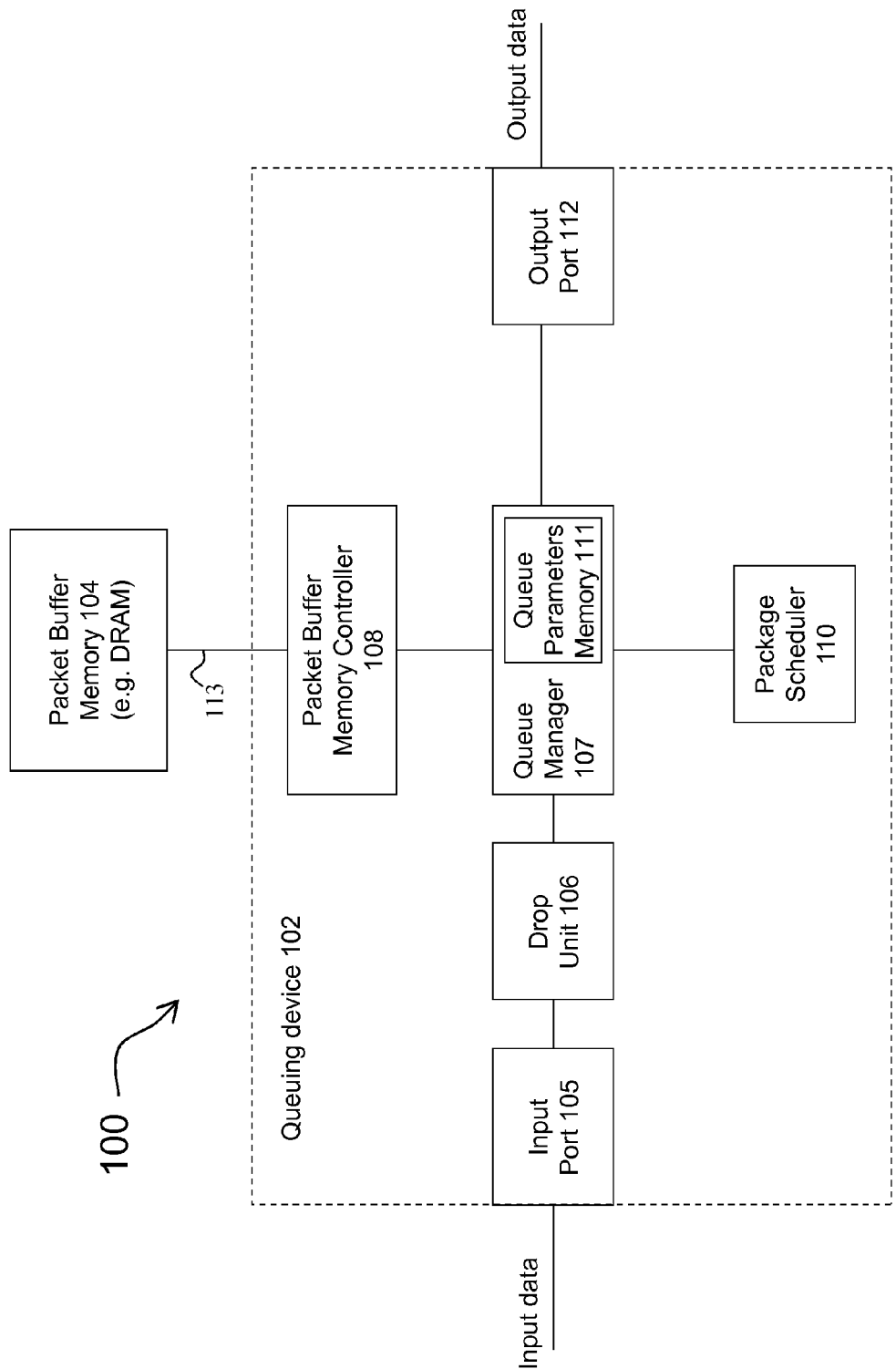

| | | | |
|---|---|---|---|
| 7,826,469 B1* | 11/2010 | Li | H04L 47/2441 370/412 |
| 2003/0065735 A1* | 4/2003 | Connor | H04L 49/90 709/212 |
| 2003/0226092 A1* | 12/2003 | Kim | H04L 1/0041 714/776 |
| 2006/0268913 A1 | 11/2006 | Singh et al. | |
| 2007/0223483 A1 | 9/2007 | Huang et al. | |
| 2008/0170571 A1 | 7/2008 | Kumar et al. | |
| 2009/0034549 A1* | 2/2009 | Soni | H04L 12/5693 370/412 |
| 2011/0085464 A1* | 4/2011 | Nordmark | H04L 49/101 370/252 |

OTHER PUBLICATIONS

International Search Report (in English) for PCT/EP2010/070545, mailed Mar. 22, 2011; ISA/EP.

* cited by examiner

PACKET BUFFER COMPRISING A DATA SECTION AND A DATA DESCRIPTION SECTION

CROSS-REFERENCE TO RELATED APPLICATIONS

This application is a 371 U.S. National Stage of International Application No. PCT/EP2010/070545, filed on Dec. 22, 2010, and claims priority to Swedish Patent Application No. 1050043-7, filed on Jan. 18, 2010, and the benefit of U.S. Provisional Application No. 61/295,792, filed on Jan. 18, 2010, the disclosures of which are herein incorporated by reference in their entirety.

TECHNICAL FIELD

The present invention relates to a packet buffer memory for storing packets in a communications network. The present invention relates further to a method and a system for storing and scheduling packets in a communications network.

BACKGROUND OF THE INVENTION

In communication networks, many devices, such as routers, switches, modems, network interface cards and other elements, store packets in queues, e.g. packet buffers, and schedule packets from queues by means of queuing devices such as traffic managers, network processors, switching elements and framers. Many prior art devices implement packet buffers using a random access memory (RAM), such as a dynamic random access memory (DRAM).

Common objectives in packet buffer design are to provide a packet buffer fulfilling the requirements of low cost, low power dissipation, high storage capacity and elastic sharing of buffer memory among queues. By elastic sharing is meant that the size of a queue may be permitted to exceed a fixed portion of the total buffer memory if there is sufficient memory space left unused by other queues.

Low cost and low power dissipation is often attained by using a DRAM as main buffer memory. Elastic sharing of memory among queues is attained by using a page-based memory, e.g. a DRAM, in which page-based memories queues allocate new pages on demand and unused pages are kept track of in a free-list.

However, a difficulty in the design of a packet buffer system having a DRAM as the main packet buffer is the random access properties of the DRAM. For example, a DRAM may have an access time of 50 ns. If a buffer system comprising such a DRAM is used in a communication network having a high bit rate of e.g. 10 Gb/s or more, as line-rate, the minimum time between two consecutive accesses to arbitrary addresses in the DRAM exceeds the maximum time permitted between two minimum-size packets transmitted at the line-rate.

In order to provide packet buffers for communication networks having a high bit rate and to overcome the slow access time of a DRAM, fast packet buffers have been designed using fast static random access memories (SRAMs) instead of slow DRAMs. Today, fast SRAMs having access times below 4 ns are available and such SRAMs are suitable for a 40 Gb/s packet buffer. However, SRAMs are small (i.e. have a small buffer capacity), expensive and highly power-consuming. Therefore they are only used in networking components requiring only small packet buffers. If large packet buffers are required, the number of SRAMs required will be high causing the packet buffer to be very expensive and power-consuming.

The article "Designing packet buffers for router linecards" to Iyer et al. IEEE/ACM Transactions on networking, vol. 16, no. 3, June 2008, discloses a packet buffer comprising a hierarchy of SRAM and DRAM in order to provide a packet buffer having the speed of a SRAM and the cost of a DRAM. Data that is likely to be needed soon is held in the fast SRAM, while the rest of the data is held in the slower DRAM. The disclosed packet buffer comprises two SRAM caches. One of the SRAM cache, i.e. the tail SRAM cache, is configured to hold packets at the tail of the each FIFO queue, and the other SRAM cache, i.e. the head SRAM cache, is configured to hold packets at the head of each FIFO queue. The majority of the packets at each queue, i.e. the packets that are neither close to the tail nor to the head of the queue, are held in the slow DRAM. When packets arrive to the packet buffer they are written to the tail SRAM cache. Further, when enough data has arrived for a queue (either from multiple small packets or from a single large packet), but before the tail SRAM cache overflows, the data are gathered together in a large block and written to the DRAM. Similarly, in preparation for when packets need to depart, blocks of packets are read from the DRAM into the head SRAM cache to ensure that packets to be read will be in the head SRAM cache in time for the reading operation.

A drawback with the packet buffer disclosed by Iyer et al. is that it stores the tail and head data in an on-chip SRAM cache. If many queues exist, the required amount of SRAM for the cache will need to be large making it infeasible to fit this SRAM on-chip.

The U.S. Pat. No. 6,470,415 B1 to Starr et al. discloses a device for queuing information. The device combines the speed of SRAM with the low cost and low power consumption of DRAM. The device comprises a first queue and a second queue formed of a combination of SRAM and DRAM storage units. Each of the first and second queues has an SRAM head and an SRAM tail, which can be used as an SRAM FIFO. Further, each of the first and second queues has the ability to queue information in a DRAM body.

If a device, such as a processor, wants to store data in a queue, information regarding that data is sent to a queue manager which manages entries in multiple queues, such as the first and second queues. Data from the processor is entered in the head of the queue, which is composed of SRAM and referred to as a SRAM head. Should the information be needed shortly by the processor, the entry can be directly read from the SRAM head and sent back to the processor. If the entry is not needed shortly, in order to provide room for another entry in the SRAM head, the entry is moved from the SRAM head to the DRAM body. Entries are dequeued to the processor from the queue in a similar fashion as entries are enqueued, with the processor requesting the next entry from the queue and receiving that entry from the SRAM tail. Entries in the DRAM are sequentially moved from the DRAM body to the SRAM tail so that entries are immediately available for dequeuing to the processor.

A drawback with the device disclosed in U.S. Pat. No. 6,470,415 B1 to Starr et al. is that also this device stores the tail and head data in an on-chip SRAM cache. If many queues exist, the required amount of SRAM for the cache will need to be large making it infeasible to fit this SRAM on-chip.

Another method for overcoming the access limitation of the DRAM is to store linked-list elements comprising packet information e.g. a packet length and a next-element pointer in a linked list comprised in an SRAM arranged external of a queuing device. By means of the information in the linked list, data in the DRAM can be accessed much faster than if data comprised in the DRAM were to be accessed without the information in the linked list. One linked-list element corresponds to a piece of packet data in the DRAM, e.g. by direct mapping between a linked-list element and a DRAM memory page. In this case the amount of DRAM memory storing a packet is rounded off to an integer number of pages.

However, a problem with storing the linked list in an SRAM is that the SRAM, even if it can handle higher packet rates than a DRAM, cannot handle packet rates higher than a maximum packet rate given by 1/(memory round-trip time). The memory round-tripe time being defined as the time between two packets which time is given by the time for issuing a read for a linked list element, getting that linked list element from the memory, extracting the pointer and length for the next linked list element, and issuing a read for the next linked list element. Thus the packet rate is limited by the random access time of the SRAM.

Another drawback with the prior art devices is the time that has to lapse between two scheduling decisions taken by the packet scheduler since this time limits the packet rate.

Yet another drawback is low DRAM memory utilization due to packet quantization. For example, if the DRAM page size is 512 bytes and the buffer is filled with 64-byte packets only, the memory utilization is only 64/512=12,5%. A further drawback is the cost of the SRAM.

SUMMARY OF THE INVENTION

An aim of the present invention is to overcome the problems and drawbacks with the prior art packet buffers and packet buffer systems.

The present invention solves the above-mentioned problems and drawbacks among others by adding the abstraction of packages on top of packets. Since a package has a minimum size that is greater than the minimum packet size, the acceptable latency of reading linked list elements is increased, whereby the linked list can be stored in a packet buffer memory, such as a DRAM, instead of in a SRAM.

Further, the use of packages enables contiguous usage of the buffer memory, i.e. the memory for storing a packet need not be rounded off to an integer number of memory pages, which yields higher memory utilization as compared to the prior art packet based systems.

Furthermore, since the package has a minimum size that is greater than the minimum packet size, a package scheduler can be used instead of a packet scheduler. The package scheduler can make scheduling decision less frequently than a packet scheduler, i.e. the package scheduler only needs to make decision at maximum package rate rather than at maximum packet rate.

Further, the present invention aim to provide a data buffer configured for use in a communication network having a high bit rate of e.g. 10 Gb/s or more, preferably a high bit rate of 100 Gb/s or more.

The present invention relates to a data buffer memory for storing data in a data communications network, comprising a data section comprising a number of memory pages; and a package descriptor section comprising a number of package descriptors; wherein at least one queue of packets is stored in the data section as an ordered set of packages, and wherein a package is an ordered set of packets. An ordered set is a set comprising at least one object, wherein the order of the objects within the set is defined. For example, a sequence of packets is an ordered set of packets In embodiments, the sum of the length of the packets comprised in a package exceeds a threshold value for the package.

In embodiments, the ordered set of packages is stored as a number of memory pages in the data section.

In embodiments, each package has a package descriptor stored in the package descriptor section.

In embodiments, each packet in the package has a packet descriptor stored in the data section.

In embodiments, for each queue of packets, an ordered set of package descriptors is stored in the data buffer memory.

In embodiments, for or each queue of packets, a linked list of package descriptors is stored in the data buffer memory.

In embodiments, the data buffer memory is a dynamic random access memory.

The present invention also relates to a data buffer memory system comprising a queuing device connected to a data buffer memory, the queuing device comprising a queue manager connected to a data buffer memory controller and to a package scheduler, wherein the queue manager is configured to allocate, in the data buffer memory, an ordered set of physical memory pages for each queue, wherein the ordered set of physical memory pages for each queue forms a logical, contiguous memory for each queue.

In embodiments, the queue manager comprises a queue parameters memory configured to store queue parameters for a number of queues of packets.

In embodiments, the package scheduler is configured to select from which queue to dequeue a package using a scheduling algorithm.

In embodiments, the queue manager is configured to, upon a scheduler request from the package scheduler, read one package at a time from the packet buffer memory.

In embodiments, the queue manager is configured to parse the one or more headers of the packets comprised in the read package, to segment the package into a number of packets and to send the packets to an output port of the queuing device.

The present invention also relates to a method for storing data in a data buffer memory comprised in a data communications network. The method comprising the steps of providing a data section comprising a number of memory pages providing a package descriptor section comprising a number of package descriptors; and storing at least one queue of packets in the data section as an ordered set of packages, wherein a package is an ordered set of packets.

In embodiments, the method comprises further the step of, for each queue of packets, storing a linked list of package descriptors in the data buffer memory.

In embodiments, the method comprises further the step of storing the ordered set of packages as a number of memory pages in the data section.

In embodiments, the method comprises further the step of, for each package storing a package descriptor in the package descriptor section.

In embodiments, the package descriptor comprises additional information regarding the package, such as a package length equal to the accumulated sum of packet lengths and packet length offsets of the packets comprised in the package.

In embodiments, the method comprises further the step of, for each packet, storing a packet descriptor in the data section.

In embodiments, the method comprises further the step of, for each queue of packets, storing an ordered set of package descriptors in the data buffer memory.

In embodiments, the method comprises further the step of, for each queue of packets, storing a linked list of package descriptors in the data buffer memory.

In embodiments, the data buffer memory is a dynamic random access memory.

In embodiments, a queuing device is connected to a data buffer memory, the queuing device comprising a queue manager connected to a data buffer memory controller and to a package scheduler. The method further comprises the steps of, by means of the queue manager allocating, in the data buffer memory, an ordered set of physical memory pages for each queue. The ordered set of physical memory pages for each queue forms a logical, contiguous memory for each queue.

In embodiments, the method comprises further the step of, by means of a queue parameters memory comprised in the queue manager, storing queue parameters for a number of queues of packets.

In embodiments, the method comprises further the step of, by means of the package scheduler, selecting from which queue to dequeue a package using a scheduling algorithm.

In embodiments, the method comprises further the step of, by means of the queue manager, upon a scheduler request from the package scheduler, reading one package at a time from the packet buffer memory.

In embodiments, the method comprises further the steps of, by means of the queue manager, parsing the one or more headers of the packets comprised in the read package, segmenting the package into a number of packets, and sending the packets to an output port of the queuing device.

DETAILED DESCRIPTION OF THE DRAWINGS

Figure 2:
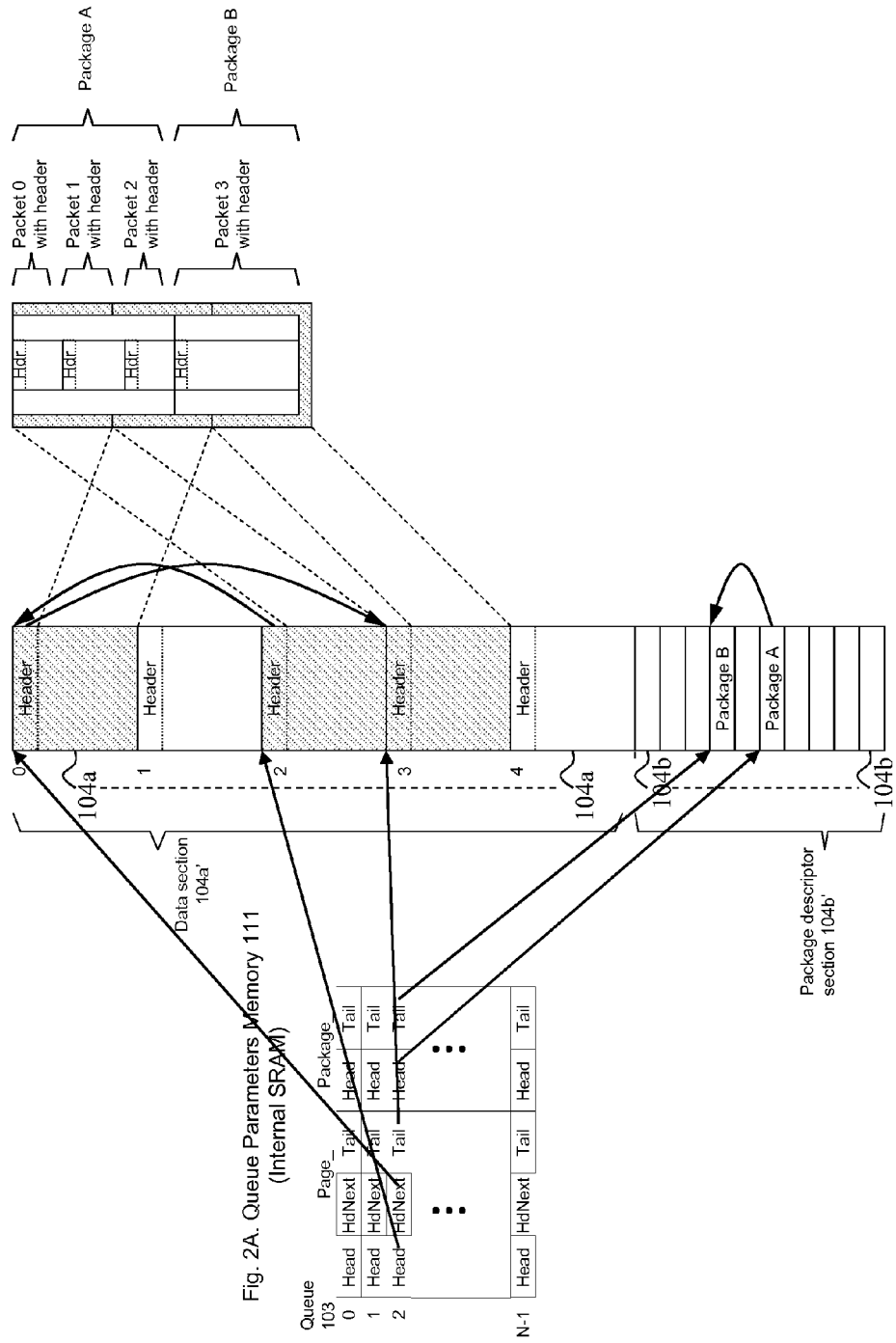
Figure 3:
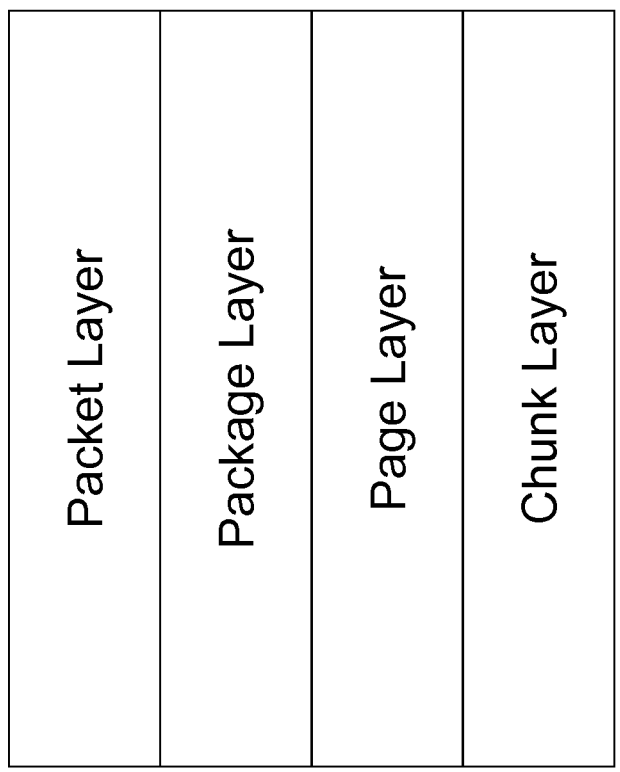

The objects, advantages and effects as well as features of the present invention will be more readily understood from the following detailed description of embodiments of the invention, when read together with the accompanying drawings, in which:

FIG. 1 schematically illustrates an embodiment of a packet buffer system according the present invention;

FIG. 2 schematically illustrates an embodiment of the data structure of a packet buffer system according to the present invention; and FIG. 3 schematically illustrates a layered representation of the data structure of FIG. 2.

DETAILED DESCRIPTION OF EMBODIMENTS OF THE INVENTION

While the invention covers various modifications and alternative methods, apparatuses and systems, embodiments of the invention are shown in the drawings and will hereinafter be described in detail. However, it is to be understood that the specific description and drawings are not intended to limit the invention to the specific forms disclosed. On the contrary, the scope of the claimed invention is intended to include all modifications and alternative constructions thereof falling within the spirit and scope of the invention as expressed in the appended claims to the full range of their equivalents. In the drawings, the same reference numeral is used for the same or similar feature.

FIG. 1 schematically shows an embodiment of a data buffer system 100, such as a packet buffer system, according to the present invention. In the description below, the present invention is described with reference to a packet buffer system, a packet buffer memory, a packet buffer memory controller and a package scheduler. However, this should not be interpreted as limiting, instead is should be understood to encompass a data buffer system, a data buffer memory, a data buffer memory controller and a data scheduler.

In this description, the term data should be understood to refer to a collection of packets, and the term packet should be understood to refer to a formatted unit of data, for example a packet of the Internet protocol, an Ethernet frame, an ATM cell or a system-internal format. A packet comprises two types of information: control information and user data, such as payload data. The control information provides information that the network needs in order to deliver the user data, for example, source and destination addresses, error detection codes like checksums, and sequencing information. Typically, control information is found in packet headers or trailers, with the user data in between.

The embodiment of the packet buffer system 100 comprises a queuing device 102 connected to a packet buffer memory 104 arranged externally of the queuing device 102. However, it should be understood that the queuing device 102 may comprise the packet buffer memory 104.

In embodiments, the inventive packet buffer memory 104 comprises two sections: a data section configured to physically store packets in one or more pages, and a package description section configured to store package descriptors each package descriptor comprising information about a package, cf. FIG. 2B. A package is a logical storage container into which one or multiple packets are aggregated, as will be described in more detail below. Further, package comprises an integer number of chunks making up the package.

The packet buffer memory 104 may be a DRAM.

According to the embodiment shown in FIG. 1, the queuing device 102 comprises an input port 105 configured to receive input data, such as packets, and to extract information about each input data, e.g. packet. The input port 105 could for example be configured to extract information from a packet header or from sideband attributes, i.e. as a dedicated signal within the input port. The extracted packet information may comprise a queue number identifying the queue 103 selected by the packet, a packet length, and other information such as class of service (CoS) and drop precedence.

The queuing device 102 comprises further a drop unit 106 connected to the input port 105 and configured to perform a packet drop decision based on the extracted packet information and based on state information about the queue 103 selected by the packet. Thus, the drop unit 106 can decide to enqueue the packet or to drop the packet based on the extracted packet information and based on state information about the queue 103 selected by the packet. The state information about that queue 103 could for example be that the queue 103 is full or the queue 103 comprises one or more empty entries.

The drop unit 106 may further be configured to perform drop decision based on packet drop algorithms such as tail drop and weighted random early detection (WRED).

Further, the queuing device 102 comprises a queue manager 107 connected to the drop unit 106 and to a packet buffer memory controller 108 arranged in communication with the packet buffer memory 104. In embodiments the packet buffer memory controller 108 is comprised in the queuing device 102.

The queue manager 107 is configured to aggregate one or more received packets which are to be enqueued into a logical storage container called a package.

For every empty queue, i.e. a queue comprising one or more empty entries, a package is held open and waits for packets to arrive. Packets that are decided to be enqueued are, by means of the queue manager 107, divided into page-sized data units, i.e. pages, and added in an order-preserving fashion to the package, i.e. the arrival order between the packets are kept in the package so that the packet arriving first will be the first packet in the package and the packet arriving last will be the last packet in the package. New packets are added to the package until the total amount of packet data in the package exceeds a threshold value for the package. The threshold value could for example be 256 bytes or 2 Kbytes, or a threshold value there between. When the package size exceeds the threshold value the package is closed, and a new package is opened.

The queue manager 107 is configured to read and/or write a package or a part of a package to/or from the packet buffer memory 104 by emitting a sequence of read requests and/or write requests for the chunks making up the package to the packet buffer memory 104. The chunk size permits efficient reading and writing of the packet buffer memory. For example, a chunk may correspond to one or multiple DRAM bursts, and the chunk size may be e.g. 16 bytes or 64 bytes.

The packages are arranged in a logical, contiguous memory, i.e. a logical memory wherein the packages are arranged adjacent to one another and appear to be connected, but may in fact be disconnected, cf. FIG. 2C. The logical, contiguous memory may be a logical first-in-first-out (FIFO) queue.

The logical, contiguous memory may be implemented by linking physical memory pages comprised in the packet memory buffer 104 to form contiguous packages. The physical memory pages comprised in the packet buffer memory 104 may be of a fixed size. The next pointers used for linking pages are stored in the same packet buffer memory 104 as the content of the pages. Preferably, each page 104*a* of the packet buffer memory 104 has a header comprising a next pointer pointing to the next page, cf. FIG. 2B.

The queue manager 107 comprises a queue parameters memory 111, e.g. an internal SRAM, configured to store queue parameters, such as pointers to the head page and a write offset within the head page, pointers to the next page, pointers to the tail page and offset for write within the tail page, and pointers to the head package and to the tail package. Thus, in embodiments, the queue parameters memory 111 is configured to store queue parameters for both the page layer and the package layer for each queue 103 numbered 0 to N−1, cf. FIG. 2A.

The queuing device 102 comprises further a package scheduler 110 connected to the queue manager 107 and configured to select from which queue 103 to dequeue a package using a suitable scheduling algorithm; e.g. round-robin, weighted round-robin, deficit weighted round robin, weighted fair queuing, strict priority queuing, earliest deadline first or a combination of scheduling algorithms. Queues may be organized in a scheduling hierarchy.

Upon a scheduler request from the package scheduler 110, the queue manager 107 reads, via the packet buffer memory controller 108, one package at a time from the packet buffer memory 104. By parsing the headers of the packets comprised in the read package, each packet header comprises information about the packet's length, the queue manager 107 can segment the package into a number of packets and send the packets to an output port 112 of the queuing device 102. Thus, output data, e.g packets, exit the queuing device 102 by means of the output port 112.

FIG. 2 shows an exemplary representation of a queue 103 having queue number 2 storing four packets; packet 0 to packet 3, in two packages; packages A and packages B, which in turn are stored in three pages; page 0, page 2 and page 3.

Thus, the shadowed pages, i.e. page 0, page 2 and page 3, of the data buffer memory 104 are used by queue number 2, cf. FIGS. 2A and 2B. The linked pages form a piece of contiguous logical memory, cf. FIG. 2C, holding packages which may cross page borders. The packages in the contiguous logical memory are configured to have a minimum size, e.g. in the interval from 256 bytes through 2 Kilobytes.

However, it should be understood that different packages in the contiguous logical memory do not have to have the same minimum size, but could have different minimum sizes. For example, the package size could be configurable per queue. The minimum size is preferably pre-determined and is determined by the required data read rate.

For example, if a scheduler is capable of making scheduling decisions at rate RS [1/s] and the required data read rate is RD [bits/s], the minimum package size should be set greater than or equal to RD/RS [bits].

In embodiments, the package is configured to hold at least one packet in its entirety, but preferably the package is configured to hold a number of packets in their entirety. However, as mentioned above, the packages may cross page borders and thus may not need to hold pages in their entirety. As illustrated in FIG. 2C, package A comprises packet 0, packet 1, and packet 2, and package B comprises packet 3. However, as illustrated, package A comprises page 2 and a first part of page 0, and package B comprises a second part of page 0 and page 3.

Further, as illustrated in FIG. 2A, the queue parameters memory 111 is configured to comprise queue parameters for N queues, numbered from queue number 0 to queue number N−1. For each queue, the queue parameters memory 111 comprises a number of page layer queue parameters and a number of package layer queue parameters.

The page layer queue parameters may comprise Page_Head, Page_HdNext and Page_Tail pointers, i.e. pointers to the head page, to the next page, and to the tail page, respectively. The package layer queue parameters may comprise Package_Head and Package_Tail pointers, i.e. pointers to the head package and to the tail package, respectively. However, it should be understood that further queue parameters, such as queue length and error-correcting codes may be comprised in the queue parameters memory 111.

As schematically illustrated in FIG. 2, the Page_Head pointer comprised in the queue parameters memory 111, cf. FIG. 2A, points to the address of the first (head) page, i.e. page number 2, comprised in the packet buffer memory 104, cf. FIG. 2B, from which first page reading should start when the packets are to be dequeued.

Further, the Page_HdNext pointer comprised in the queue parameters memory 111, cf. FIG. 2A, points to the start address of the next page, page number 0 in FIG. 2B, and the Page_Tail pointer points to the start address of the last (tail) page, page number 3 in FIG. 2B, of the queue 2, at the end of which page reading should be stopped when the packets are to be dequeued, or at the end of which page further data should be written if more packets are to be enqueued.

As illustrated in FIG. 2B, each packet buffer memory page 104*a* contains a page header, which comprises a next field pointing to the next page in case the page is not the last page of the queue. Further, the packet buffer memory 104, e.g. the DRAM, comprises two sections: a data section 104*a*' storing pages 104*a* comprising packet data (i.e. payload data) and a package descriptor section 104*b*' storing package descriptors 104*b*. Thus, packet data, packet lengths and next-page pointers are all stored in the packet buffer memory 104.

The Package_Head and Package_Tail pointers for queue number 2, which are comprised in the queue parameters memory 111, point to the first and last package descriptors for the packages A and B, respectively. Each package descriptor 104*b* includes a next field pointing to the next package unless the package is the last one of the queue. As illustrated in FIG. 2B, the package description of Package A includes a next field pointing to Package B.

The package descriptor 104*b* may comprise additional information regarding the package such as a package length equal to the accumulated sum of packet lengths and packet length offsets of the packets comprised in the package. A packet length offset may be received with every packet as packet information. When a package is scheduled, i.e. when the package is to be read and the packets comprised therein are to be sent to the output port 112 of the queuing device 102, the package scheduler 110 uses this package length to update state information of algorithms for shaping and scheduling.

In FIG. 2 parameter sets for one or multiple queues of pages and used for free lists holding unused pages and package descriptors are not shown.

As previously mentioned, the package scheduler 110 is configured to select a non-empty queue to read a package from, and issues a dequeue command to the queue manager 107. This could be performed periodically. The queue manager 107 reads the package head parameter "Package_Head" and the package tail parameter "Package_Tail" for the queue. The head parameter "Package_Head" and the tail parameter "Package_Tail" are comprised in the queue parameters memory 111. Via the packet buffer memory controller 108, the queue manager 107 reads the first package of the queue from the packet buffer memory 104 as indicated by the package head parameter "Package_Head" for the queue. In embodiments, the queue manager 107 reads a package by breaking down the read operation into chunk read operations, i.e. the queue manager 107 reads the chunks of the package one by one.

Thus, upon a scheduler request from the package scheduler 110, the queue manager 107 reads the chunks of one package. By parsing the headers of the packets comprised in the read first package, each package header comprises information about the packet's length, the queue manager 107 can segment the package into a number of packets and send the packets to the output port 112 of the queuing device 102.

The PageHdNext pointer prevents loss of read bandwidth in case a package starts near the end of a page. When this package is selected, the page indicated by the PageHead pointer will be immediately finished, and thanks to the PageHdNext pointer the queue manager can continue by reading package data from the next page without having to wait for a read operation to return a new page pointer.

When the packets of the first package has been sent to the output port 112, the queue manager 107 reads via the packet buffer memory controller 108 and by means of the pointer comprised in the next field of the read first package, the next package. By parsing the headers of the packets comprised in the read next package, the queue manager 107 can segment the next package into a number of packets and send the packets to the output port 112 of the queuing device 102.

In embodiments, the queue manager 107 is configured to adjust its rate of read and write requests to the capacity of the packet buffer memory controller and of the output port. For example, the queue manager 107 may be stopped by backpressure when intermediate storage of data in the output port or in the intermediate storage of requests in the memory controller is about to fill up.

Thereafter, the queue manager 107, by means of the pointer in the next field of the next package, reads the following package, parses the headers of the packets comprised in the read following package, segments the read following package into a number of packets and send them to the output port 112 of the queuing device 102. This procedure is repeated until the last package as indicated by the Package_Tail parameter has been read by the queue manger 107.

Once a package has been read from the queue, the associated data, e.g. queue parameters, the pages and the package descriptors are removed from the queue parameters memory 111 and the packet buffer memory 104. Freed queue elements are enqueued to a free-list comprised in the internal SRAM 111. As previously mentioned, packet data read from the packet buffer memory 104 is sent to an output port 112 of the queuing device 102.

Thus, unlike packet schedulers of the prior art packet buffer systems, in which the packet scheduler is configured to operate on packets, the package scheduler 110 comprised in embodiments of the packet buffer system according to the present invention is configured to operate on packages and configured to select one of the packets comprised in the package at a time. Because the minimum size of a package is greater than the minimum size of a packet, the minimum amount of data scheduled for dequeuing is greater in the packet buffer system according to the present invention than in the prior art packet buffer system. Further, because the minimum size of a package is greater than the minimum size of a packet, the combination of a package scheduler 110 and a queue manager 107 according to the present invention can be scaled to higher data rates, e.g. to data rates of 100 Gb/s or more, than those of the prior art packet buffer system.

If the package scheduler 110 reads data from a queue faster than data is written to the queue, the queue manager 107 can read the last, unfinished package and does not need to wait for it to get filled up to the threshold. This means that if the queue contains less packet data than the minimum package size, these packets can still be read. Thus, the queue manager does not need to wait for a complete package to fill up.

In embodiments, the packet data buffer memory 104 is a DRAM and the packet buffer memory controller 108 is a DRAM controller. In such embodiments, in order to attain high utilization of a DRAM data bus 113 connecting the DRAM to the DRAM controller it is advantageous for the queue manager 107 to read a certain minimum amount of data, referred to as a chunk. It means that the package size is preferably rounded off to an integer number of chunks. If the chunks are 32 bytes, this means that a package size of 512 bytes, i.e. 16 chunks, is preferable to e.g. package sizes of 511 or 513 bytes. Thus, a package having a size of e.g. 511 or 513 bytes would be rounded off to correspond to 16 chunks.

Further a chunk may consist of one burst of data per DRAM bank, and if a burst consists of four clock cycles of data on the DRAM data bus, there may be four banks, and the width of the data bus may be 32 bits, yielding a chunk size of 512 bits. If such chunks are used, packages are preferably aligned to chunk boundaries; i.e., the last bits of a chunk may be left unused if the amount of memory used by the packets and packet headers in the chunk does not add up to a integer number of chunks.

It should be understood that a package is an integer number of chunks having a fixed-size, and that a package also is an integer number of packets having a variable size within minimum and maximum limits.

FIG. 3 shows a layered representation of the data structure. Packets are stored in packages which are stored in a contiguous, logical memory presented by the page layer. The chunk layer splits up pages into chunks; i.e., smaller units adapted to the operation of the DRAM, when writing pages to DRAM. The chunk layer also assembles chunks read from DRAM to pages.

The invention claimed is:

1. A data buffer memory comprising:
a data section comprising a number of memory pages; and
a package descriptor section comprising a number of package descriptors,
wherein at least one queue of packets is configured to be stored in the data section as an ordered set of packages,
wherein a package is an ordered set of packets,
wherein a package descriptor comprises additional information regarding the package, including a package length equal to an accumulated sum of packet lengths and packet length offsets of the packets comprised in the package,
wherein each package descriptor of a package includes a field pointing to a next package unless the package is a last package in the at least one queue,
wherein a sum of lengths of packets comprised in a package exceeds a threshold value for the package, and
wherein for each queue of packets, a linked list of package descriptors is configured to be stored in the data buffer memory.

2. The data buffer memory of claim 1, wherein the ordered set of packages is configured to be stored as a number of memory pages in the data section.

3. The data buffer memory of claim 1, wherein each package has a package descriptor configured to be stored in the package descriptor section.

4. The data buffer memory of claim 1, wherein each packet in the package has a packet descriptor configured to be stored in the data section.

5. The data buffer memory of claim 1, wherein for each queue of packets, an ordered set of package descriptors is configured to be stored in the data buffer memory.

6. The data buffer memory of claim 1, wherein the data buffer memory is a dynamic random access memory.

7. A data buffer memory system comprising:
a queuing device connected to the data buffer memory of claim 1,
wherein the queuing device comprises a queue manager connected to a data buffer memory controller and to a package scheduler,
wherein the queue manager is configured to allocate, in the data buffer memory, an ordered set of physical memory pages for each queue, and
wherein the ordered set of physical memory pages for each queue forms a logical, contiguous memory for each queue.

8. The data buffer memory system of claim 7, wherein the queue manager comprises a queue parameters memory configured to store queue parameters for a number of queues of packets.

9. The data buffer memory system of claim 7, wherein the package scheduler is configured to select from which queue to dequeue a package using a scheduling algorithm.

10. The data buffer memory system of claim 7, wherein the queue manager is configured to, upon a scheduler request from the package scheduler, read one package at a time from the data buffer memory.

11. The data buffer memory system of claim 10, wherein the queue manager is configured to parse one or more headers of the packets comprised in a read package, to segment the package into a number of packets and to send the packets to an output port of the queuing device.

12. A method for storing data in a data buffer memory, the method comprising:
providing a data section comprising a number of memory pages;
providing a package descriptor section comprising a number of package descriptors;
storing at least one queue of packets in the data section as an ordered set of packages; and
storing, for each queue of packets, a linked list of package descriptors in the data buffer memory,
wherein a package is an ordered set of packets,
wherein a package descriptor comprises additional information regarding the package, including a package length equal to an accumulated sum of packet lengths and packet length offsets of the packets comprised in the package,
wherein each package descriptor of a package includes a field pointing to a next package unless the package is a last package in the at least one queue,
wherein a sum of lengths of packets comprised in a package exceeds a threshold value for the package.

13. The method of claim 12, further comprising storing the ordered set of packages as a number of memory pages in the data section.

14. The method of claim 12, further comprising, for each package storing a package descriptor in the package descriptor section.

15. The method of claim 12, further comprising, for each packet, storing a packet descriptor in the data section.

16. The method of claim 12, further comprising, for each queue of packets, storing an ordered set of package descriptors in the data buffer memory.

17. The method of claim 12, wherein the data buffer memory is a dynamic random access memory.

18. The method of claim 12, wherein a queuing device is connected to the data buffer memory, the queuing device comprising a queue manager connected to a data buffer memory controller and to a package scheduler, the method further comprising:
allocating, using the queue manager, in the data buffer memory, an ordered set of physical memory pages for each queue,
wherein the ordered set of physical memory pages for each queue forms a logical, contiguous memory for each queue.

19. The method of claim 18, further comprising:
Storing, in a queue parameters memory comprised in the queue manager, queue parameters for a number of queues of packets.

20. The method of claim 18, further comprising:
Selecting, using the package scheduler, from which queue to dequeue a package using a scheduling algorithm.

21. The method of claim 18, further comprising:
  reading, using the queue manager, one package at a time from the data buffer memory upon receiving a scheduler request from the package scheduler.

22. The method of claim 21, further comprising using the queue manager:
  parsing one or more headers of the packets comprised in a read package;
  segmenting the package into a number of packets; and
  sending the packets to an output port of the queuing device.

* * * * *